G. O. HANSHEW.
DEMOUNTABLE STEEL TIRE.
APPLICATION FILED SEPT. 30, 1919.

1,363,411. Patented Dec. 28, 1920.

WITNESSES

INVENTOR
George O. Hanshew
BY
Redding & Greeley
ATTORNEYS

UNITED STATES PATENT OFFICE.

GEORGE O. HANSHEW, OF BROOKLYN, NEW YORK, ASSIGNOR TO INTERNATIONAL MOTOR COMPANY, OF NEW YORK, N. Y., A CORPORATION OF DELAWARE.

DEMOUNTABLE STEEL TIRE.

1,363,411.  Specification of Letters Patent.  Patented Dec. 28, 1920.

Application filed September 30, 1919. Serial No. 327,427.

*To all whom it may concern:*

Be it known that I, GEORGE O. HANSHEW, a citizen of the United States, residing in the borough of Brooklyn of the city of New York, in the State of New York, have invented certain new and useful Improvements in Demountable Steel Tires, of which the following is a specification, reference being had to the accompanying drawing, forming a part hereof.

This invention relates to a demountable steel tire applicable to a standard truck wheel in order to produce a so-called "good-roads wheel," without the necessity of making special patterns for the wheel castings. The improved tire by reason of the devices associated therewith may be readily applied to the rim of any standard truck wheel without modifying the construction of the wheel or its rim. In accordance with the invention a filler, preferably of somewhat yielding material, such as wood, is interposed between the rim of the wheel and the tire and suitable locking devices are operatively mounted with relation to the rim and the filler for the purpose of securing the tire demountably on the wheel.

In the accompanying drawing are illustrated two applications of the invention to a cast steel wheel, in which—

Figure 1:
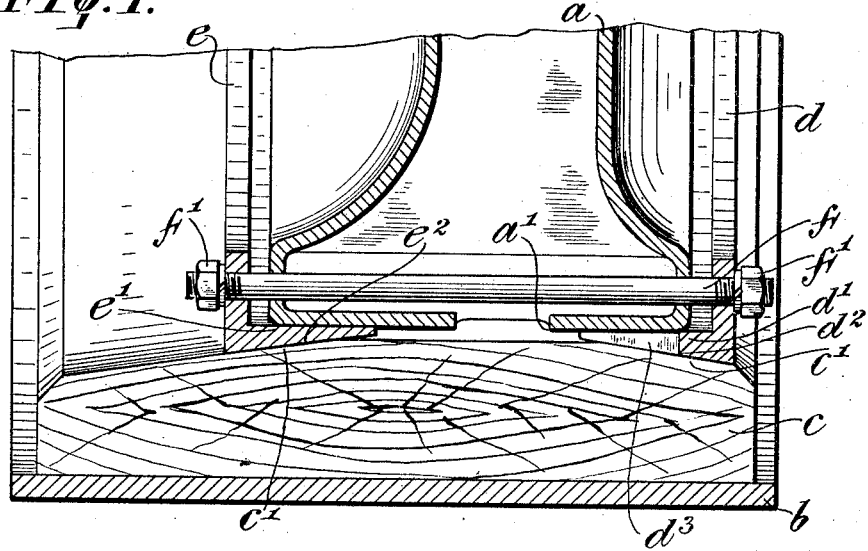
Figure 1 is a view in cross section of a fragment of a wheel showing the application of the steel tire thereto.

The wheel $a$, which may be of any construction, but which is illustrated herein as a standardized type of cast steel wheel for trucks, is adapted to have applied to its rim $a'$, the improved devices for mounting the steel tire $b$. This tire is of generally great width, forming a tread of such character as is adaptable for so-called "good-roads" work. Its width is greater than that of the rim $a'$ of the wheel and so the problem of securing it demountably to the rim without alteration of the latter becomes one which is peculiar to this relationship. Interposed between the tire $b$ and the rim $a'$ is a filler $c$, preferably of somewhat yielding material, such as wood, and this filler is of a width substantially equal to the width of the tire although not necessarily extending completely between the edges thereof. The filler may be formed as a series of segments or as an annulus, the grain of the wood in either case preferably running parallel to the axis of the wheel. The filler $c$ is of greater width than the rim $a'$. The outer periphery of the filler $c$ conforms to the inner periphery of the tire $b$, but the inner periphery of the filler is provided with reversely tapered sections $c'$, $c^2$ for a purpose which will appear. In the embodiment shown in Fig. 1 locking rings $d$, $e$ at opposite sides of the wheel $a$ are formed with inwardly extending circumferential flanges $d'$, $e'$, respectively, the inner faces of which flanges may rest flush against the rim $a'$ and the outer faces of which are tapered, as at $d^2$, $e^2$, respectively, to engage the reversely tapered sections $c'$ of the filler $c$. These rings may be locked in position and drawn inwardly toward the wheel by means of through-bolts $f$ which pass through the rings and the wheel and have at their ends nuts $f'$. By setting up on one or both of the nuts $f'$, the rings $d$, $e$ are drawn toward each other and the tapered flanges $d'$, $e'$ are wedged tightly in between the rim $a'$ and the tapered sections $c'$ of the filler $c$ thereby locking the tire $b$ demountably in place. To increase the clamping and gripping action of the rings $d$, $e$, springiness is given by providing one or both of them with milled slots, $d^3$ indicating one of said slots in one of these rings $d$. It will be evident that by reason of the width of the filler $c$, the contacting surfaces of the flanges $d'$, $e'$ with the filler should be of relatively great superficial area so as to afford adequate support for the wheel on the tire and press the filler $c$ outwardly into engagement with the tire with a firm binding contact.

Figure 2:
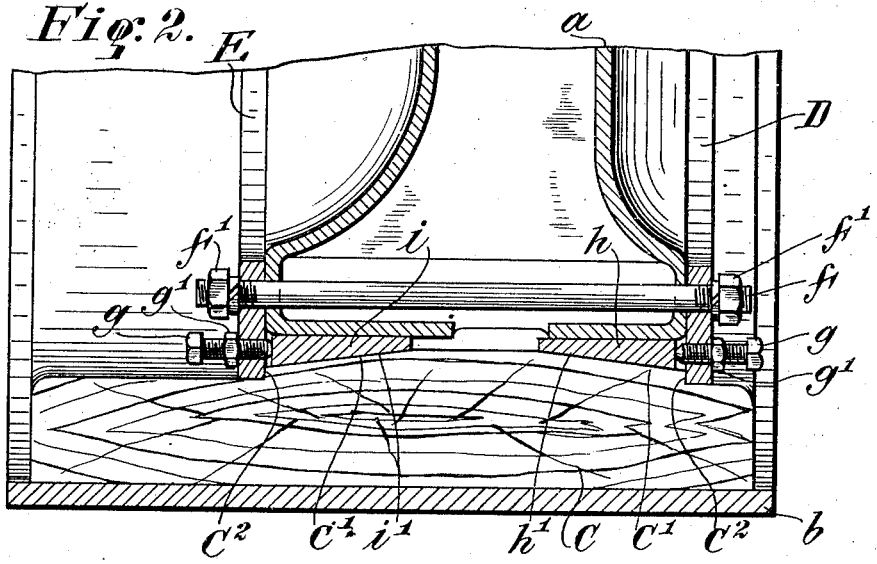
Fig. 2 is a view similar to Fig. 1 but showing modified retaining devices for the tire.

In the modification shown in Fig. 2 the filler C in addition to the reversely tapered sections C' is formed with circumferential shoulders $C^2$ at the ends of such tapered sections. The retaining rings D, E at opposite sides of the wheel $a$ are secured snugly against the opposite faces of the rim $a'$ by means of the bolt $f$ and nuts $f'$. These rings D, E, are of greater diameter than the wheel $a$ and carry adjacent their peripheries set screws $g$ which extend through the rings and may be adjustably locked by means of lock nuts $g'$ threaded thereon. The inner ends of the set screws $g$ bear against the independent locking rings $h$, $i$, the inner faces of which rest against the rim $a'$ and the outer faces of which are reversely tapered, as at $h'$, $i'$, to bear against the reversely tapered sections C' of the filler C. These tapered rings $h$, $i$ are forced inwardly with a wedging action between the rim $a'$ and the filler C by setting up on the screws $g$ and, when the desired binding action is effected, locking such screws in place by means of the nuts $g'$. The inner peripheral edges of the retaining rings D, E bear against the shoulders $C^2$ of the filler C, the whole construction affording a substantial support for the wheel on the tire in much the manner described in connection with the embodiment shown in Fig. 1.

Changes in details of construction and in the form of parts may be made without departing from the invention, the essential characteristics of which are related to the peculiar problem of locking a wide tread tire demountably on a rim which is narrower.

I claim as my invention:

1. In combination with the rim of a wheel, a tire therefor of substantially greater width than the rim, a filler of relatively yielding material and of substantially the width of the tire and provided with reversely tapered sections adjacent the rim, and tapered locking rings operatively engaged with the rim and interposed between the rim and the tapered sections to secure the tire demountably to the rim.

2. In combination with the rim of a wheel, a plane cylindrical tire of substantially greater width than the rim, a filler of relatively yielding material and of substantially the width of the tire provided with reversely tapered sections adjacent the rim, locking rings having annular flanges formed integral therewith, one face of each of which rests on the rim and the other face of each of which is tapered to engage the tapered section of the filler and bolts engaging the rings to secure the flanges in position to hold the tire demountably on the rim.

This specification signed this 27" day of Sept. A. D. 1919.

GEORGE O. HANSHEW.